United States Patent
Totale et al.

(10) Patent No.: US 10,146,885 B1
(45) Date of Patent: Dec. 4, 2018

(54) METHOD AND SYSTEM FOR DECIDING ON ORDERING OF SCRIPTING LANGUAGE SOURCE CODE FOR DEPENDENCY RESOLUTION

(71) Applicant: EMC Corporation, Hopkinton, MA (US)

(72) Inventors: Sachin G. Totale, Bangalore (IN); Julian M. Hjortshoj, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 219 days.

(21) Appl. No.: 13/710,030

(22) Filed: Dec. 10, 2012

(51) Int. Cl.
*G06F 17/30* (2006.01)

(52) U.S. Cl.
CPC ................ *G06F 17/3089* (2013.01)

(58) Field of Classification Search
CPC ........ G06F 9/45516; G06F 8/20; G06F 8/433; G06F 17/3089; G06F 9/45529; G05B 2219/36032
USPC ......................................... 717/102, 114, 115
See application file for complete search history.

(56) References Cited

U.S. PATENT DOCUMENTS

| | | | |
|---|---|---|---|
| 8,533,675 B2 * | 9/2013 | Duggal et al. ............... | 717/120 |
| 2004/0030717 A1 * | 2/2004 | Caplin ...................... | 707/103 R |
| 2004/0267824 A1 * | 12/2004 | Pizzo et al. .................. | 707/200 |
| 2006/0225028 A1 * | 10/2006 | Lau et al. .................... | 717/102 |
| 2009/0031210 A1 * | 1/2009 | Backhouse ......... | G06F 17/3089 715/234 |
| 2011/0296381 A1 * | 12/2011 | Mooney ........................ | 717/122 |
| 2011/0320426 A1 * | 12/2011 | Dutta .................. | G06F 17/3089 707/709 |
| 2012/0079361 A1 * | 3/2012 | Itoko ................. | G06F 17/30887 715/205 |
| 2012/0143866 A1 * | 6/2012 | Mameri ................. | G06F 8/433 707/737 |
| 2012/0311522 A1 * | 12/2012 | Perisic et al. ................. | 717/102 |
| 2013/0191439 A1 * | 7/2013 | Kern et al. .................... | 709/203 |

* cited by examiner

*Primary Examiner* — Leslie Wong
(74) *Attorney, Agent, or Firm* — Dergosits & Noah LLP; Todd A. Noah

(57) ABSTRACT

Disclosed are systems and methods for ordering scripting language source code. A request for a first scripting language resource may be received. The first scripting language resource may provide one or more functionalities for a web application. A second scripting language resource may be identified based on dependency information. In some implementations, the dependency information identifies a dependency between the first scripting language resource and the second scripting language resource. A response including the first and second scripting language resources may be generated. In some implementations, the first and second scripting language resources may be ordered based on the dependency information. In various implementations, the response may be capable of being transmitted to a web browser.

17 Claims, 8 Drawing Sheets

METHOD AND SYSTEM FOR DECIDING ON ORDERING OF SCRIPTING LANGUAGE SOURCE CODE FOR DEPENDENCY RESOLUTION

BACKGROUND

The present invention relates to the field of information technology, including, more particularly, systems and techniques for ordering scripting language source code.

In web 2.0 based user interface (UI) applications, application logic may be implemented in client side scripting language source code. While loading the application in a web browser, the web browser typically downloads scripting language resources, such as JavaScript libraries, from an application server. The web browser subsequently interprets and executes the scripting language resources in order of appearance.

The UI application may be an enterprise application. An enterprise application may be enterprise software that is used to offer services from a cloud-based environment. Thus, employees of an organization, such as an enterprise, may use an enterprise application for a particular service, such as a business-oriented tool, that enables the organization to perform business activities. In enterprise applications, scripting language resources may be organized as modules and classes. The modules may be stored in separate files. The scripting language resources in the enterprise application may depend on various other scripting language resources. The web browser may load the scripting language resources in order of dependency so that the web browser may interpret and execute the scripting language resources successfully. If scripting language resources are not available or interpreted and executed out of order, dependency related errors may occur because a function or process that is being executed might not yet have access to one or more resources that it depends on.

Enterprise applications may be customizable and extendable. Thus, they may provide mechanisms to add custom functionalities (e.g. custom components and resources) into the enterprise application. These custom functionalities are commonly implemented in client side scripting language source code. However, conventional enterprise applications are limited because they cannot resolve dependencies for scripting language resources efficiently and using few network requests, such as hypertext transfer protocol (HTTP) requests. Thus, web browsers are not able to successfully interpret and execute scripting language resources associated with components of the enterprise application, such as custom components and newly added functionalities.

DETAILED DESCRIPTION

Figure 1:
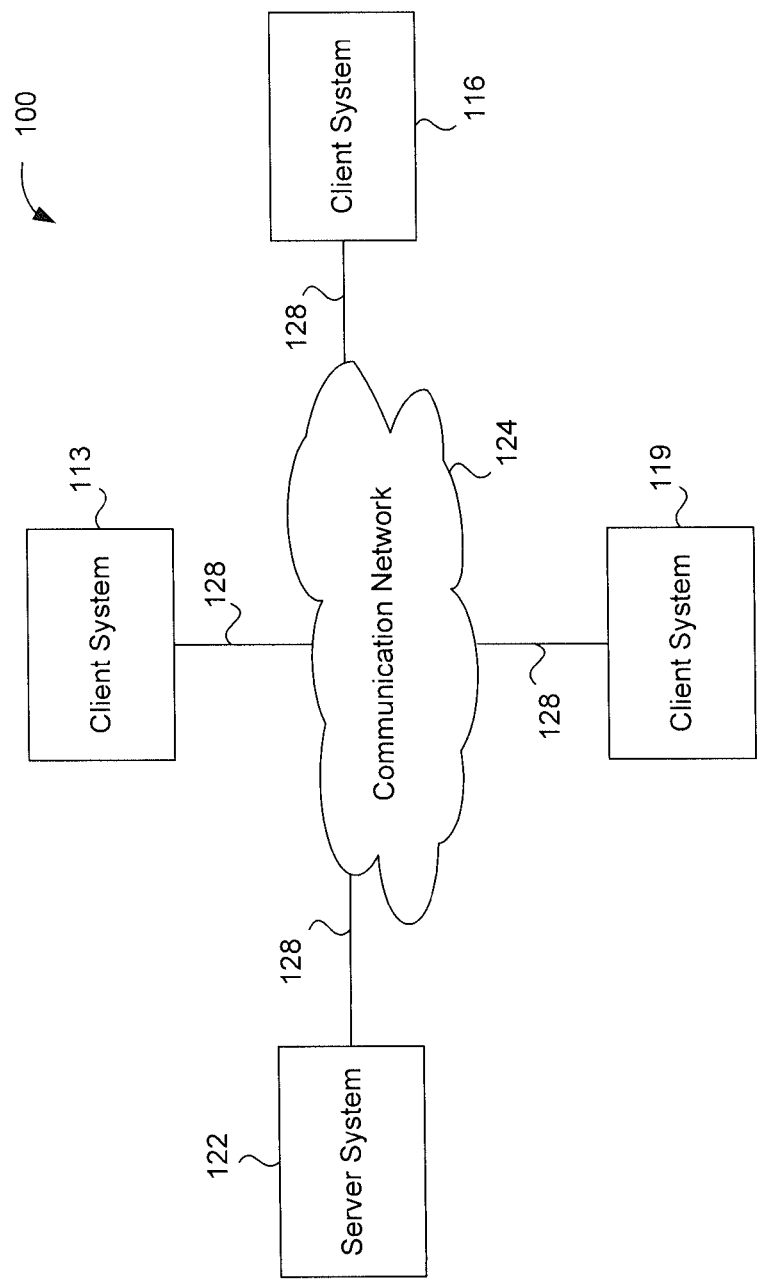
FIG. 1 shows a block diagram of a client-server system and network, implemented in accordance with some implementations.

As previously mentioned, a UI application, such as an enterprise application, may use client side scripting language source code to support various functionalities of the UI application. In various implementations, the scripting language source code may be one or more scripting language resources. In some implementations, a resource may refer to a scripting language class that may be a functional unit of code. In some implementations, the resource may perform one or more functions. For example, the resource may handle function calls to and from a server. In some implementations, a scripting language resource may be a function library for a scripting language designed to run in a web browser. For example, the scripting language resource may be a library of JavaScript functions. In various implementations, an enterprise application may be configured to include new functionalities. New client side scripting language source code may be needed to support the new functionalities.

Conventional methods may use standard inclusion methods, such as standard JavaScript or CSS file inclusion. In standard inclusion methods, scripting language source files contain "include" statements with references to other source files that they depend on. When a source file is loaded, the browser parses it, and makes individual requests for the dependencies (and the dependencies of the dependencies) until all source files are loaded. Thus, standard inclusion methods load scripting language source code, such as source files associated with resources, individually in separate requests from the browser. In high latency networks, multiple individual requests may lead to very slow page load times, especially when the resources are not already cached by the browser. For example, requests sent to and from a software application deployed in a wide area network (WAN) may experience latencies upwards of several hundred milliseconds. Thus, many requests handled in a serial fashion may result in long latencies.

Conventional methods may also use build-time concatenation of scripting language source code. In this method, an appropriate ordering of scripting language resources is determined during product development, and added into build scripts. When the application is packaged, scripting language resources are combined into a single script file which is deployed to the application, and served to the browser as a static resource. Build-time concatenation of scripting language source code may provide the browser with properly ordered scripting language source code for resources known ahead of time (i.e. at build time). However, any additional scripting language resources used by UI application functionalities, such as plug-ins, customizations, or optional features, are requested separately using the standard inclusion method, and thus incur long latencies due to multiple requests.

In various implementations, systems and methods are provided to order scripting language resources dynamically and during run-time. In some implementations, a request for one or more resources, such as scripting language resources, may be received from a client machine. In various implementations, the request may be generated in response to a user adding a new component to a software application. The request may also be generated in response to a user action or system generated event, such as closing a dialog or beginning or ending a session of the enterprise application. In response to receiving the request, a server-side application may analyze the requested one or more resources to identify additional resources that the requested one or more resources depend on. The server-side application may then retrieve the additional resources. If the additional resources depend on any other resources, those other resources may be retrieved as well. The server-side application may then determine an order for all of the resources based on their dependencies. The resources may then be merged into a single file. Thus, the single file may include the requested one or more resources as well as any resources they depend on. Moreover, the resources included in the file may be ordered based on their dependencies. The file may be transmitted back to the client machine dynamically and during run time.

Accordingly, parts of a software application, such as an enterprise application, may be added to or removed as plug-ins without rebuilding the software application, and without using additional requests between the client machine and the software application. In some implementations, this also allows subsets of a scripting language resource to be loaded, along with all of their dependencies, in a single request. Thus, if a specific set or "bundle" of resources is associated with a particular functionality of an enterprise application, the resources may be retrieved and ordered correctly with all of their respective dependencies resolved. Moreover, all of the resources may be returned to the web browser in a single HTTP request, and without knowing the complete set of resources at build time.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
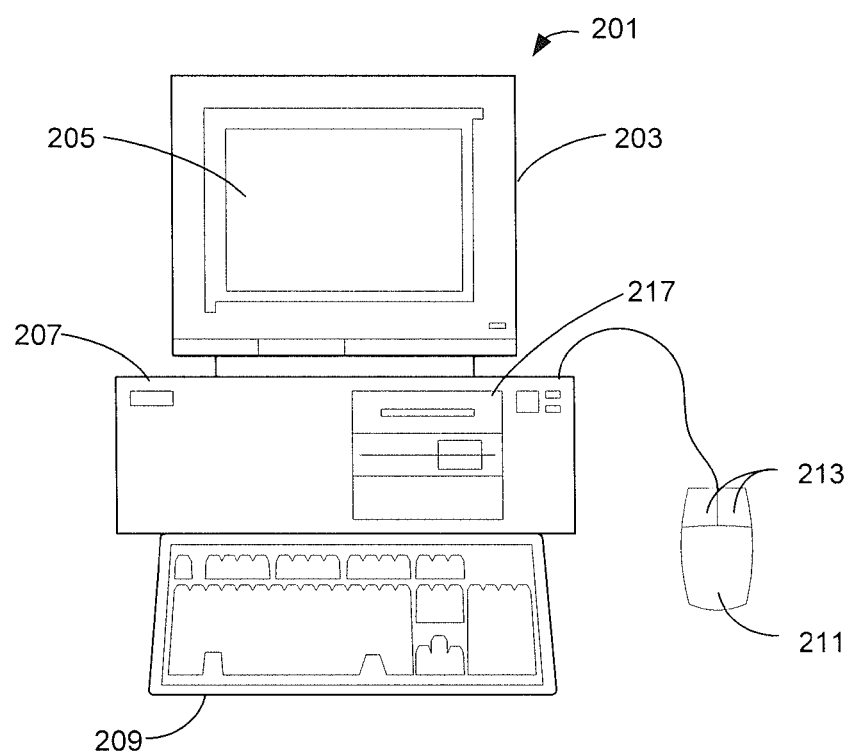
FIG. 2 shows a more detailed diagram of an exemplary client or computer, implemented in accordance with some implementations.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer, or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
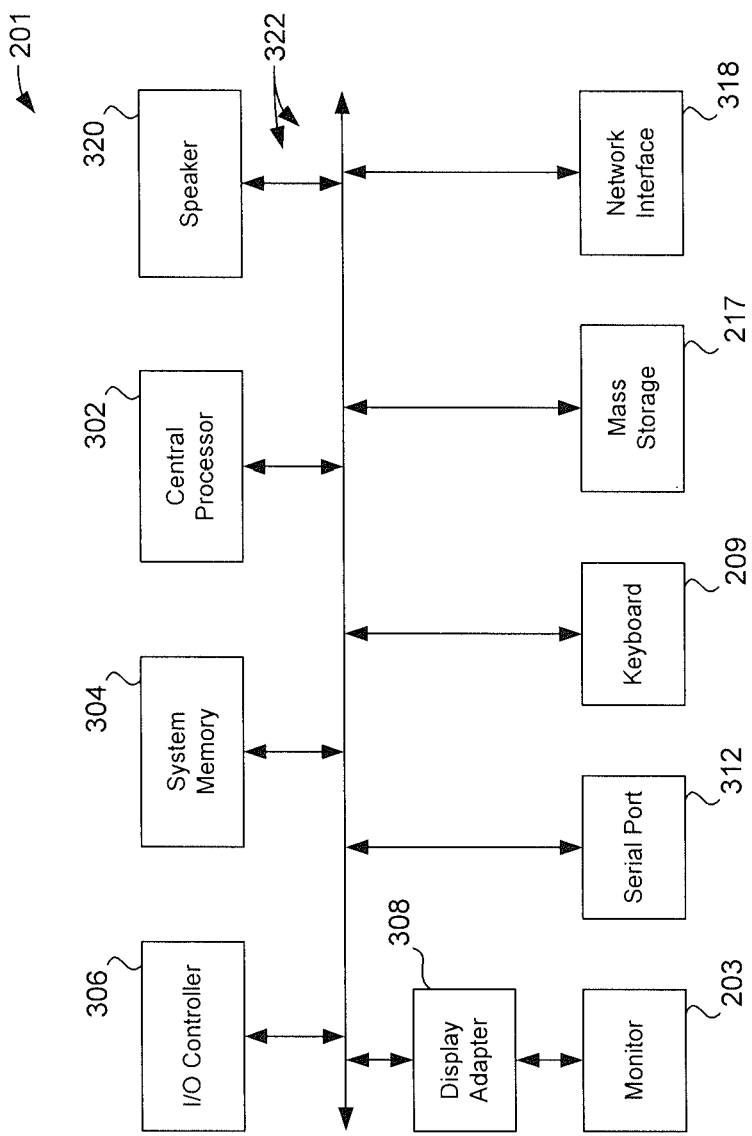
FIG. 3 shows a system block diagram of a client computer system, implemented in accordance with some implementations.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from extensible markup language (XML) files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
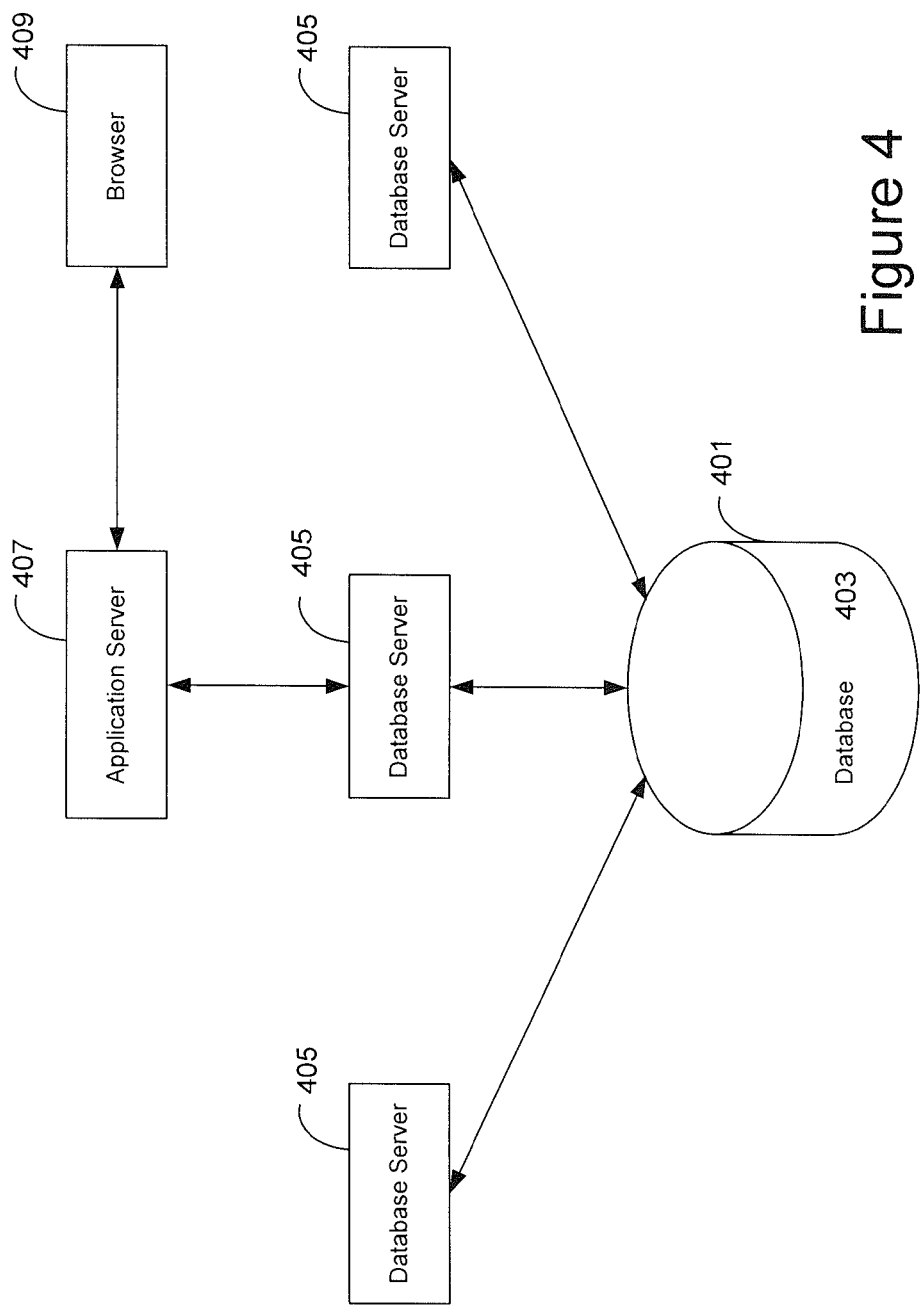
FIG. 4 shows a data source or data service in the form of a database system, implemented in accordance with some implementations.

FIG. 4 shows a data source or data service in the form of a database system. A database may be part of a database management system associated with an enterprise application. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an XML database. An XML database is a data persistence software system that allows data to be stored in XML format. Another example is a relational database management system (RDMS) which uses tables to store the information. In yet another example, the database may be a generic database file system which stores and identifies files based on their characteristics and metadata, such as type of file, topic, or author. Thus, a database file system may provide a storage location, such as a class path, used to store one or more files or resources at that particular storage location.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various portions of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
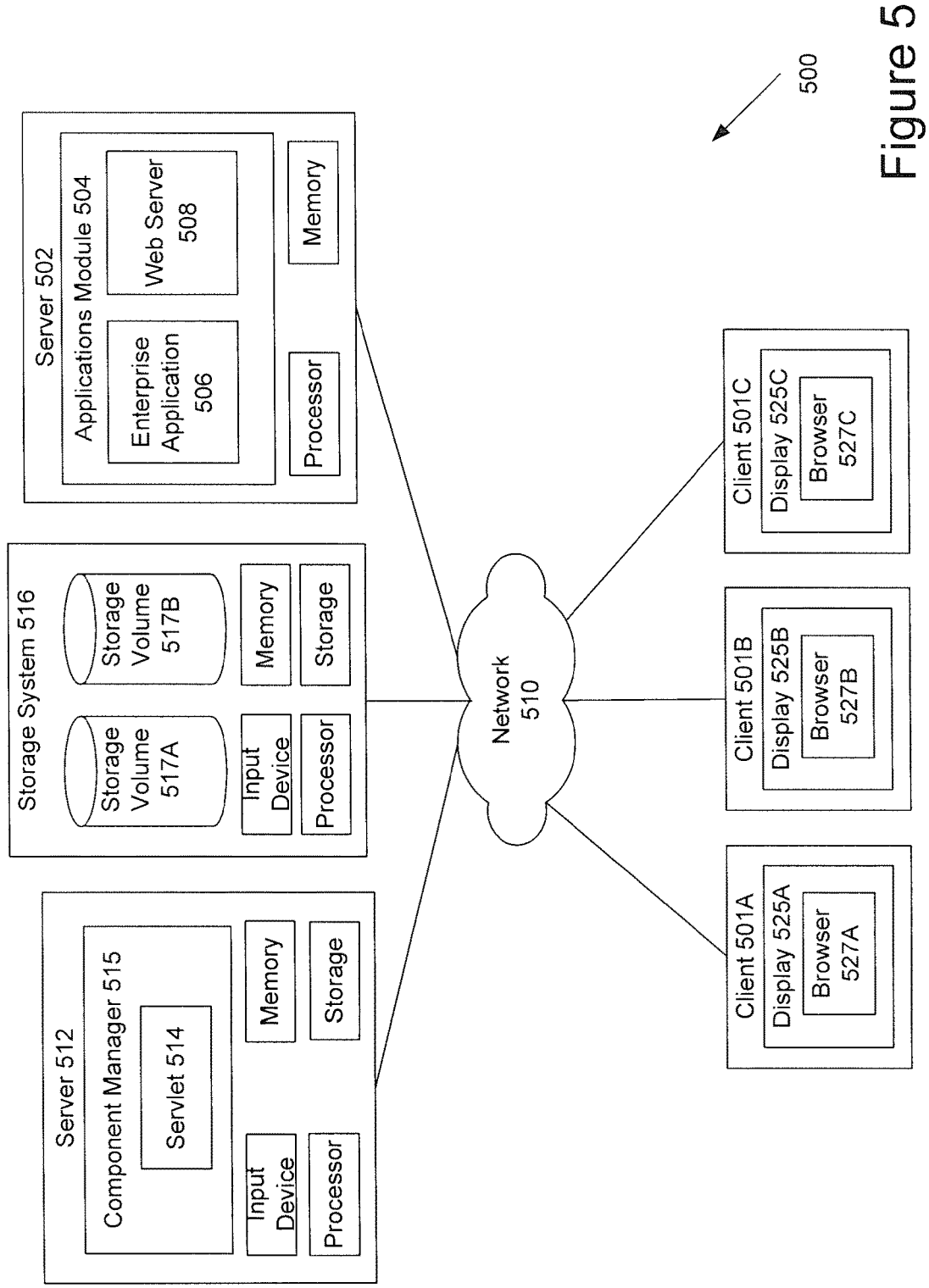
FIG. 5 shows a system block diagram of an example of a system for ordering scripting language resources, implemented in accordance with some implementations.

FIG. 5 shows a block diagram of an example of a system for ordering scripting language resources, implemented in accordance with some implementations. In various implementations, system 500 may include server 502, applications module 504, enterprise application module 506, web server 508, network 510, server 512, servlet 514, component manager 515, storage system 516, storage volume 517A, and storage volume 517B. Moreover, system 500 may include any number of clients such as first, second, and third clients 501A, 501B, and 501C which access various components of system 500 via network 510.

The clients are general purpose computers with hardware and software, such as shown in FIGS. 1 and 3 described above. For example, the first client includes a first display 525A, a first application program (e.g., first browser program) 527A, an input device, a processor, memory, and storage. Similarly, the second client includes a second display 525B, a second application program (e.g., second browser program) 527B, an input device, a processor, memory, and storage. The third client includes a third display 525C, a third application program (e.g., third browser program) 527C, an input device, a processor, memory, and storage.

FIG. 5 shows three clients. It should be appreciated that an enterprise can have any number of clients such as tens, hundreds, or thousands of clients. The clients execute executable code (or computer-readable code) that embodies a technique or algorithm as described in this application. The browser is an application program that can request, receive, and process data from a user, the server, or both. The data can be shown via a display. While FIG. 5 illustrates the data being displayed on a client machine, the data can also be displayed on a mobile device such as a mobile phone, laptop computer, or computer tablet.

In various implementations, system 500 may include server 502. The server includes components similar to the components described in FIGS. 1 and 4. In some implementations, server 502 may include hardware and software used to run one or more services to serve the needs of other computers and users on network 510. Thus, server 502 may include one or more processors and memory capable of executing software operations and serving webpages. It will be appreciated that in some implementations, server 502 may comprise several servers in a distributed or cloud computing network.

In various implementations, server 502 may include an applications module, such as applications module 504. In some implementations, applications module 504 includes software and hardware that may be used to execute one or more software applications. Thus, applications module may include software and/or firmware instructions that configure the functionality of server 502.

According to various implementations, applications module 504 includes enterprise application 506. In particular implementations, enterprise application 506 may include software instructions that, when executed by one or more processors, perform one or more operations associated with an enterprise application. Thus, enterprise application 506 may include software instructions that configure operation of the enterprise application, and configure operation of a user's instance of the enterprise application. For example, code specific to a user's account or functionalities associated with a user's session may be stored at enterprise application 506. It will be appreciated that code specific to the user's instance of the enterprise application may also be store in a memory of the client machine.

In various implementations, applications module 504 may include an application used to serve webpages, such as web server 508. In some implementations, web server 508 serves web pages to a client machine operated by a user of the enterprise application. Thus, according to various implementations, an application such as a web server 508 may deliver webpages and other content from a storage volume of server 502 to the browsers of the client machines. Thus, in some implementations, an enterprise application may be accessible to a client machine over network 510 using the browser. For example, first, second, and third users at clients 501A-501C, respectively, login by using a browser to access the application. The application may require that the user input a username and a password so that the user can be authenticated. The users may be employees, colleagues, partners, or members of the same company, organization, entity, partnership, joint venture, or have a business relationship (e.g., supplier-manufacturer relationship, or client-vendor relationship), and so forth.

In various implementations, system 500 may include server 512. In some implementations, server 512 may include component manager 515. According to various implementations, component manager 515 may be a server-implemented process executed by one or more processors of the server. In various implementations, component manager 514 may be configured to analyze the requested scripting language resources and associated dependency information to formulate a dependency graph. In various implementations, a dependency graph may be a data file or data object that stores one or more data values identifying dependency relationships between several scripting language resources. Thus, if a first resource depends on a second resource, the dependency graph may store one or more data values identifying both the first and the second resource, and further identifying that the first resource depends on the second resource. In some implementations, a dependency between two resources may be identified based on their respective order in the dependency graph. Thus, identifiers for the second resource may be stored before identifiers for the first resource in a data table. According to various implementations, the dependency graph may identify all resources that the requested resource depends on, and further identify an order of dependency for all of the resources.

In some implementations, component manager 515 may be configured to determine the dependency information that forms the basis of the dependency graph. For example, component manager 515 may be configured to parse files, such as XML files, and to analyze component definitions associated with requested components and resources to identify additional resources that the requested components and resources depend on. In various implementations, component manager 515 may also be configured to analyze include statements or any other form of information capable of identifying a dependency.

In some implementations, component manager 515 may also be configured to generate a response capable of being transmitted to one or more client machines via network 510. According to various implementations, the response may be generated by combining the resources into a single data object. The data object may be transmitted to a client machine. In some implementations, the data object may be transmitted as an HTTP response. It will be appreciated that any other suitable method of communication may be used.

In some implementations component manager 515 may include one or more servlets, such as servlet 514. In various implementations, a servlet may be a class of functions that provides an interface between a server and a client machine for a particular communications session. In some implementations, the servlet may handle function calls to and from the server and may monitor and manage other network communications with the client machine. Thus, according to some implementations, servlet 514 may handle incoming requests for components and scripting language resources. Moreover, servlet 514 may be configured to transmit a generated response to one or more client machines. It will be appreciated that while a servlet is described, any equivalent component implemented in any scripting language may be used.

In some implementations, servlet 514 and component manager 515 may be implemented in hardware, software, or some combination thereof in one or more servers of a cloud used to deploy a web application, such as an enterprise application.

In various implementations, system 500 may include storage system 516. In some implementations, storage system 516 may store scripting language resources associated with the enterprise application. In various implementations, storage system 516 may store scripting language resources that may be requested by one or more client machines to implement one or more new or custom functionalities. Thus, according to various implementations, storage system 516 may include storage volume 517A and storage volume 517B. Storage volumes 517A and 517B may be non-transitory storage media that store scripting language resources associated with the enterprise application.

It will be appreciated that while FIG. 5 shows one storage system, system 500 may include any number of storage systems. For example, system 500 may include a first storage system operated by the enterprise, such as storage system 516. System 500 may further include a second storage system operated by a third party. Thus, additional functionalities may be retrieved from the second storage system in addition to the first storage system. For example, widgets, such as GOOGLE® widgets may be retrieved from a second storage system operated by GOOGLE®.

Figure 6:
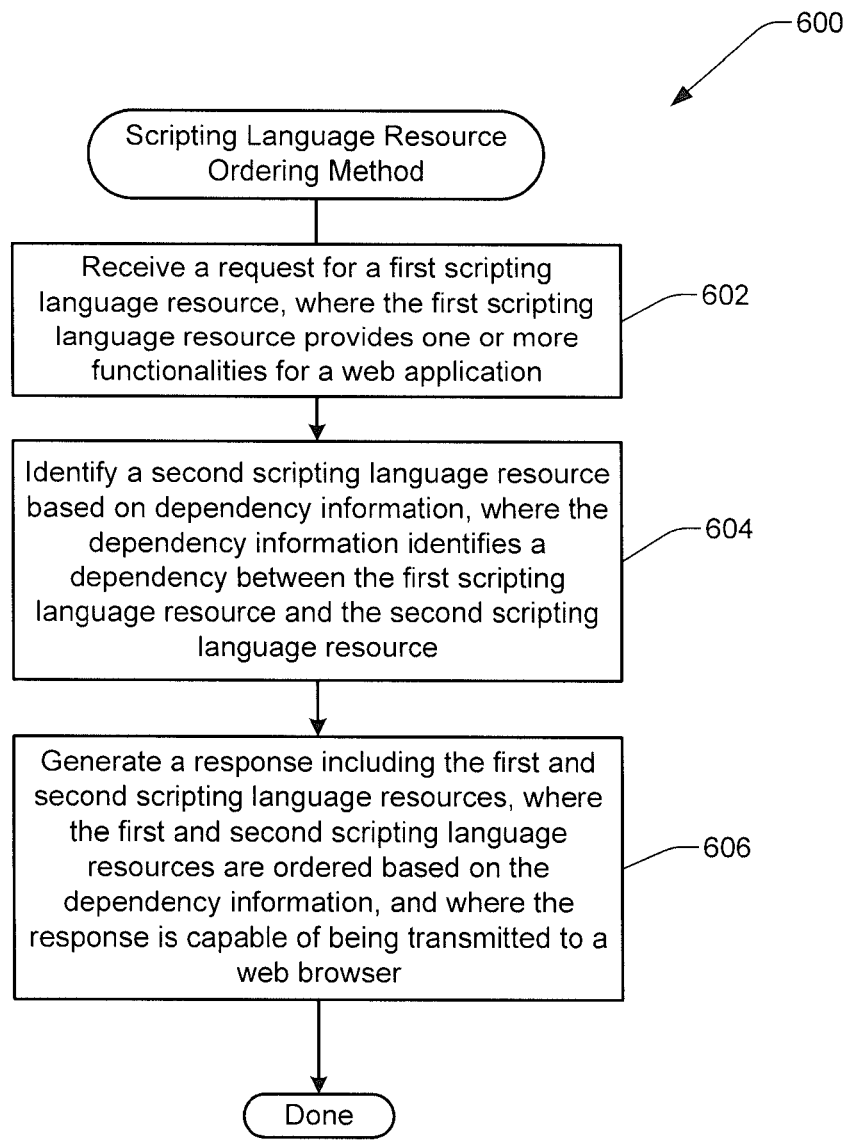
FIG. 6 shows a flowchart of an example of a method for ordering scripting language resources, performed in accordance with some implementations.

FIG. 6 shows a flowchart of an example of a method for ordering scripting language resources, performed in accordance with some implementations. In various implementations, method 600 may dynamically order scripting language resources for a web application. Thus, method 600 may receive a request for a scripting language resource, identify one or more resources that the requested scripting language resource depends on, and generate a response that includes the requested scripting language resource and any additional resources that it depends on. Moreover, the response may be ordered so that a web browser that interprets the response may do so without experiencing any dependency related errors.

Accordingly, at step 602, a request for a first scripting language resource may be received. In some implementations, the first scripting language resource provides one or more functionalities for a web application. Thus, according to some implementations, a new component and an associated scripting language resource may be requested for a web application, such as an enterprise application. In some implementations, the request may be generated by a web browser and handled by one or more servlets and a component manager at a server-side of the network.

At step 604, a second scripting language resource may be identified based on dependency information. In some implementations the dependency information identifies a dependency between the first scripting language resource and the second scripting language resource. Thus, according to some implementations, the component manager may identify any scripting language resources that the requested component or resource depends on, and may retrieve those resources to include in a response.

At step 606, a response including the first and second scripting language resources may he generated. In some implementations, the first and second scripting language resources are ordered based on the dependency information. A component manager may merge all of the scripting language resources into a single file. In some implementations, the file is capable of being transmitted to a web browser. Thus, the file may be transmitted to the client machine as a response. Because the response includes all scripting language resources that the requested component depends on and because the scripting language resources are ordered based on their respective dependencies, the client machine may interpret the file and implement the new component without any dependency related errors occurring.

Figure 7:
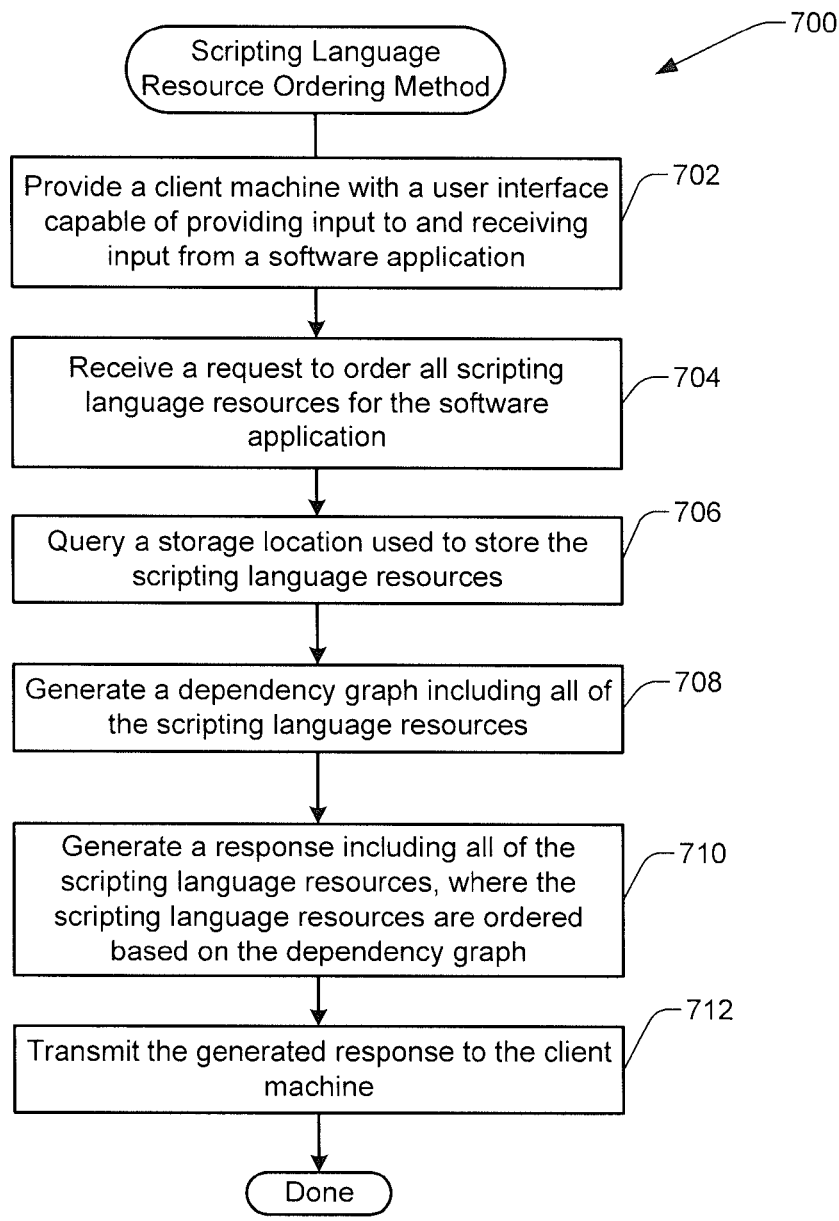
FIG. 7 shows a flowchart of an example of a method for dynamically ordering scripting language resources for a web application, performed in accordance with some implementations.

FIG. 7 shows a flowchart of an example of a method for dynamically ordering scripting language resources for a web application, performed in accordance with some implementations. In various implementations, method 700 may dynamically order all scripting language resources used by a user's instance of an enterprise application. Thus, if a user makes a change to his or her client side scripting language code by customizing a component or adding a new component to the user's instance of the enterprise application, method 700 may order all of the scripting language resources associated with the user's instance of the enterprise application. Accordingly, the client side code may be updated so that the new or customized component may be used without dependency errors or additional requests for resources.

Accordingly, at step 702, a client machine may be provided with a user interface capable of providing input to and receiving input from a software application. In various implementations, a user may be using a client machine, as shown by computer system 201 in FIG. 2. As previously discussed, while FIG. 2 shows a computer system, such as a desktop computer, in some implementations, the user may be using a mobile device, laptop computer, or computer tablet. In various implementations, the user may be using the software application provided to the client machine. As previously discussed, the software application may be a rich internet application, such as a web 2.0 application. In various implementations, the web application may be an enterprise application. One or more servers configured to execute the enterprise application may provide the client machine with a user interface and the user may interact with the enterprise application via the user interface. For example, the user may be an employee of an enterprise using a web application, such as Documentum™. The user interface may provide the user with several components, such as widgets, that the user may use to manage content associated with the enterprise. For example, the user interface may include widgets such as a repository browser, property sheets, document lists, a search tool, and a task details dialog.

At step 704, a request to order all scripting language resources for the software application may be received. In various implementations, the request may be specific to a user's instance of the enterprise application. Thus, the request may be specific to scripting language resources used by the user during his or her sessions with an enterprise application that is deployed over a network.

In various implementations, the request may be generated by the web browser that is running the user interface. In some implementations, the request may be generated in response to a user loading the application or logging into the application. Thus, according to various implementations, the request may be generated by the web browser automatically when the user interface for the web application is loaded or a new session is initiated. In some implementations, the web browser may generate a request to order all scripting language resources that may be used by the user during that session. As discussed in detail below, if any custom components were previously added to the user's instance of the enterprise application, for example during a previous session, any scripting language resources that were added along with the custom components will be ordered and accessible for the current session. It will be appreciated that the request may be generated automatically in response to any triggering event. For example, the request may be generated automatically in response to ending a session or closing a page or dialog box.

In various implementations, the request may be received by one or more servers configured to execute the enterprise application. In some implementations, one or more servlets may be implemented in the one or more servers. In various implementations, the one or more servlets may be configured to handle requests received from one or more client machines, perform one or more actions in response to receiving a request, and provide a response to the one or more client machines. Thus, according to some implementations, a servlet may receive the request generated by the web browser.

At step 706, a location may be queried for scripting language resources. As previously discussed, a user's instance of the enterprise application may include scripting language resources, such as JavaScript libraries. In various implementations, the scripting language resources may be stored at a location, such as a class path. In some implementations, a component manager implemented on a server-side of the network may query the location used to store scripting language resources for the enterprise application. In some implementations, the location may be a local class path that resides on the client machine. In various implementations, the location may be a remote class path that resides in one or more servers in a service cloud. In particular implementations, the component manager may query the path for a particular type of file configured to bundle resources, such as a Java Archive (JAR) file, that may include all scripting language resources for the user's instance of the enterprise application. Once identified, the component manager may retrieve the scripting language resources for further processing.

At step 708, a dependency graph including all scripting language resources may be generated. As previously discussed, many scripting language resources may be associated with various different components of a user's instance of an enterprise application. Because of subsequent customization of the enterprise application and its components, the resources may have changed since build time. Thus, resources added or modified subsequent to build time may be included in the class path in an unordered fashion that either results in numerous requests due to include statements or dependency errors during execution of the application by the web browser.

As previously discussed, a dependency graph may identify dependencies between resources and determine an order of the resources that does not result in dependency related errors when interpreted and executed by a web browser. In some implementations, the order of the resources in the dependency graph may be determined based on information that identifies resources specific to the user's instance of the enterprise application. In various implementations, the order may further be determined based on dependency information that identifies additional resources depended on by the resources specific to the user's instance of the application.

In various implementations, information identifying resources specific to the user's instance of an application may be determined at a design time or build time of the enterprise application. For example, a software developer or user of the enterprise application may initially select which custom scripting language resources and which out-of-the-box scripting language resources will initially be used and loaded when the enterprise application is deployed to the network. In various implementations, the information identifying the resources specific to the user's instance of the application may be determined during run time. For example, the information may be determined based on modifications to resources made by a user. A user may customize or modify one or more functionalities included in the user interface presented at the client machine. Thus, the information may be modified after build time and during run time. As previously discussed, the information may be stored in the class path in one or more files, such as a JAR file.

In various implementations, dependency information may be defined at a design time or build time of the enterprise application. For example, a software developer may define component definitions for each of the scripting language resources when initially creating and deploying an enterprise application. Thus, the software developer may define storage locations and resource dependencies associated with each scripting language resource. The component definitions may be stored as one or more XML files either locally at the client machine or remotely in one or more servers in a cloud.

In various implementations, a component manager may analyze each scripting language resource that was identified and retrieved at step 706. In various implementations, the component manager may create a data object, such as a file, that may be configured to store the result of a dependency analysis. In various implementations, the data object may be a data table that stores information identifying one or more resources in an ordered fashion. Thus, resources stored in the data table may be ordered based on their respective dependencies.

In various implementations, to perform the dependency analysis, the component manager may resolve dependencies for each resource that was identified and retrieved at step 706. Accordingly, a first retrieved resource may be added at the beginning of the data table and assigned a first index. In various implementations, the component manager may check the component definition for the first retrieved resource to determine whether or not the first retrieved resource depends on any other resources. If the first retrieved resource does depend on other resources, the other resources may be inserted in the data table before the first retrieved resource, and new indexes may be generated and assigned to reflect the new order. The same process may be repeated for the other resources that were recently added to determine if the other resources depend on any additional resources. If so, the process may be repeated until no additional dependencies are found. In this way the component manager may resolve all dependencies for the first retrieved resource and store an ordered representation of them in a data table.

Once all resources on which the first retrieved resource depends have been included in the data table, the component manager may proceed to repeat the process for a second retrieved resource. The results of the analysis for the second retrieved resource may be added to the same data table as similarly discussed above with reference to the first retrieved resource. The component manager may proceed to analyze a third retrieved resource, and so on, until all of the retrieved resources have been analyzed. In this way, all resources stored in a class path may be analyzed and included in a dependency graph along with all resources that the resources included in the class path depend on.

In some implementations, the data object created by the component manager may store information that identifies resource files instead of storing the files themselves. For example, the data table may store an identifier, an address, or a pointer that represents the resource file instead of storing the entire file itself. Thus, the data table may include an ordered list of addresses, identifiers, or pointers which may subsequently be used to identify and merge the resource files themselves.

Accordingly, at step 710, a response including all scripting language resources may be generated. In some implementations, the scripting language resources may be ordered based on the dependency graph. Thus, according to various implementations, the resources may be merged into a single file based on an order identified by the dependency graph. In some implementations, the merging may be performed via a process of concatenation. Accordingly, the scripting language resources may be merged with one another by concatenating the resource files in an order determined by the order of their respective indexes. For example, a first scripting language resource, such as a JavaScript file, with an index of "0" may be combined with a second scripting language resource with an index of "1." The combined file may then be combined with a scripting language resource with an index of "2," and so on, until all resources have been included in the combined file. Accordingly, the single file which results from the concatenation process includes an ordered representation of all scripting language resources for the user's instance of the enterprise application. Returning to a previous example, if scripting language resources associated with a custom component were previously added to the class path, all scripting language resources in the class path are now ordered so that any resources on which a particular resource depends are now interpreted and executed before that particular resource. Thus, no dependency related errors occur when the file is interpreted and executed by a web browser, and the custom component has access to all of the resources on which it depends. Because this may be performed automatically and dynamically upon startup of the application, the custom component will be usable by the user during the current session.

At step 712, the response may be transmitted to the client machine. In various implementations, the servlet may transmit the response to the client machine. In some implementations, the client machine may receive the response and update the scripting language resources stored in the class path dynamically during run-time by storing the response in the class path and replacing one or more existing files.

Figure 8:
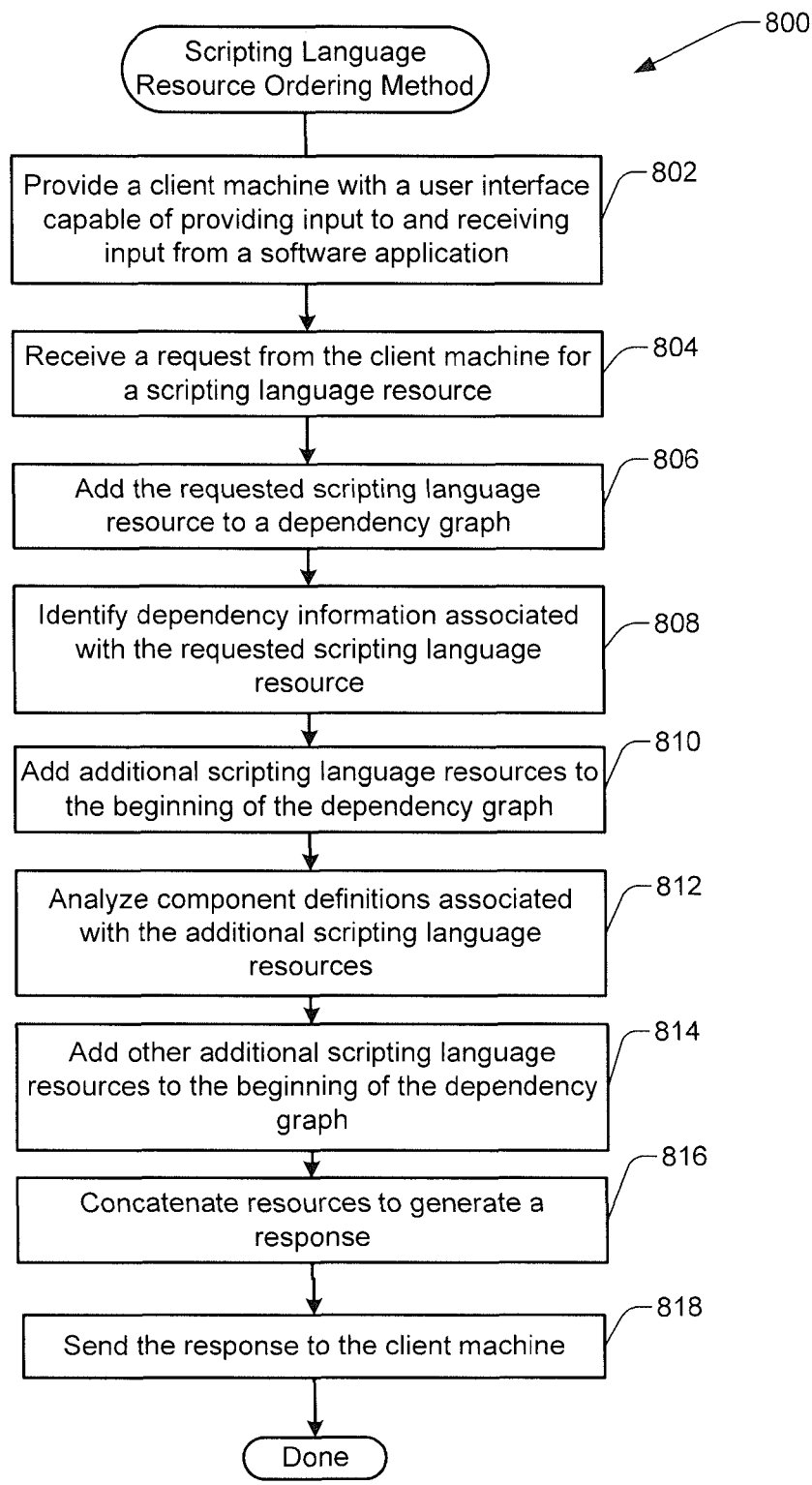
FIG. 8 shows a flowchart of an example of a method for dynamically ordering scripting language resources for a requested component, performed in accordance with some implementations.

FIG. 8 shows a flowchart of an example of a method for dynamically ordering scripting language resources for a requested component, performed in accordance with some implementations. In various implementations, method 800 may dynamically order scripting language resources associated with a specific requested component or resource. Thus, if a user adds a new component or requests a specific resource during a particular session of the enterprise application, method 800 may retrieve the requested resource, identify any additional resources that the requested resource depends on, retrieve the additional resources, order all of the retrieved scripting language resources, and generate a response that is sent back to the client machine. Thus, the client machine may receive and implement the requested component or resource during run-time so that the user may use the requested component or resource without any dependency related errors occurring or any additional requests being made.

Accordingly, at step 802, a client machine may be provided with a user interface capable of providing input to and receiving input from a software application. As similarly discussed above with reference to FIG. 7, step 702, a user may be using a software application, such as an enterprise application. More specifically, the user may be using an instance of the enterprise application that includes resources specific to the user.

At step 804, a request may be received from the client machine for a scripting language resource. As previously discussed, the scripting language resource may be a JavaScript file that provides one or more functionalities for the user's instance of the enterprise application. In various implementations, a user may perform one or more actions that cause the web browser to generate the request for one or more scripting language resources. For example, the user may customize a user interface by indicating that new components should be included in the user interface. Furthermore, according to some implementations, the user may customize various functionalities associated with existing components of the user interface.

In some implementations, the web browser may be configured to generate a request that declares dependencies associated with the requested scripting language resource. In particular implementations, the request may identify the requested resource and may include dependency information associated with the requested resource. In various implementations, the dependency information may be identified based on component definitions that are stored at the client machine or are stored remotely. As previously discussed, component definitions may have been previously defined at build time when software for the enterprise application was initially designed and deployed. In some implementations, one or more components of the web browser may be configured to query a location where the component definitions are stored and to analyze component definitions associated with the requested resource to identify additional resources that the requested resource depends on. In various implementations, one or more components of the web browser may be configured to generate a request that identifies the requested resource and declares dependencies of the requested resource on the additional resources based on the analysis of the component definitions. In some implementations, the request may be an XML configuration file.

For example, a user may provide an input to the user interface that causes the user interface application to include a widget. In some implementations, the widget may include a functionality that requires a resource. For example, the user may indicate that a navigation manager should be included in the user interface. In this instance, a navigation manager may require a JavaScript library "nav_lib", which includes a class of functions that support the ability to handle function calls that retrieve and display a navigation history. In various implementations, the web browser may store in memory of the client machine a component definition for "nav_lib". Thus, the memory may store a component definition that includes dependency information indicating that "nav_lib" includes two JavaScript files which depend on other JavaScript files, such as a first resource file and a second resource file. In various implementations, the web browser may retrieve the dependency information from the component definition and include the dependency information in an XML configuration file. In various implementations, the dependency information may be tagged and included in its own block of code. Thus the generated XML configuration file may be configured to identify the requested library, and further configured to include a tagged block of code that includes dependency information identifying the first and second resource files that the files of the requested library depend on. In various implementations, the generated XML configuration file may be transmitted from the client machine to one or more servers of the enterprise application, and received by a component of the one or more servers, such as the component manager.

At step 806, the requested scripting language resource may be added to a dependency graph. As similarly discussed with reference to FIG. 7, step 708, a component manager may build a dependency graph for the requested scripting language resource. Thus, according to some implementations, the component manager may receive the request from the client machine and create a file that stores the dependency graph for the requested resource. As similarly discussed above, the requested scripting language resource may be added to the beginning of the dependency graph. In some implementations, instead including the entire requested resource file, an identifier, an address, or pointer may be used.

At step 808, dependency information associated with the requested scripting language resource may be identified by the component manager at a server-side of the network. In various implementations, the component manager may be configured to analyze the request to identify the declared dependencies. As discussed above at step 804, the request may be an XML configuration file. An exemplary XML configuration file is shown below.

```
<library xmlns="http://documentum.emc.com/2010/UI-Model"
  id="xcp_feedback lib" version="1.0.0000.001">
    <name>xcp_feedback_lib</name>
    <description>xcp_feedback_lib</description>
    <dependencies>
       <dependency
         componentId="xcp_error_message_window"/>
       <dependency
         componentId="xcp_notification_window"/>
    </dependencies>
    <content    src="content/xcp/core/FeedbackManager.js"
       type="text/javascript"
       mode="runtime"/>
    <content  src="content/xcp/util/mixin/FeedbackContainer.js" type="text/javascript"/>
</library>
```

In some implementations, the component manager may be configured to parse the file, identify a tag included in the request, and retrieve any information included in a block associated with the tag. For example, the component manager may be configured to search the XML file for the "dependencies" tag. In some implementations, the component manager may be further configured to analyze the information included in the block associated with the "dependencies" tag. More specifically, the component manager may analyze one or more component definitions included in the XML file to identify other scripting language resources that the requested scripting language resource depends upon. In this example, after identifying the block designated by the "dependencies" tag, the component manager may analyze one or more component definitions included in the block to retrieve component identifiers that identify additional resources that the requested resource depends on. As shown in the example XML file, the block identified by the "dependencies" tag may include multiple dependency declarations. In this instance, the block includes two dependency declarations that indicate that the requested resource "xcp_feedback_lib" depends on two other resources; libraries "xcp_error_message_window" and "xcp_notification_window".

At step 810, additional scripting language resources may be added to the beginning of the dependency graph. In various implementations, after identifying additional resources that the requested resource depends upon, the component manager may continue to populate the dependency graph. Thus, according to some implementations, the resources that the requested resource depends on may be added to the beginning of the dependency graph. Returning to the previous example, the libraries "xcp_error_message_window" and "xcp_notification_window" may be added to the beginning of the dependency graph, and before "xcp_feedback_lib."

At step 812, a component definition may be analyzed for the additional scripting language resources. Thus, according to various implementations, one or more component definitions may be analyzed for the additional scripting language resources that were added to the dependency graph. The component definitions may be stored locally or remotely. Thus, according to various implementations, the component manager may analyze the component definitions and retrieve identifiers for any scripting language resources that the additional scripting language resources depend on. Returning to a previous example, component definitions for "xcp_error_message_window" and "xcp_notification_window" may be analyzed to identify any additional resources that they depend on.

At step 814, other additional scripting language resources may be added to the beginning of the dependency graph. As similarly discussed above, according to various implementations, the scripting language resources on which the additional scripting language resources depend may be added to the beginning of the dependency graph. Thus, the component manager may use retrieved identifiers to identify and retrieve the relevant scripting language resources, which may then be added to the dependency graph. Returning to the previous example, resources on which "xcp_error_message_window" and "xcp_notification_window" depend may be added to the beginning of the dependency graph and before "xcp_error_message_window" and "xcp_notification_window". In various implementations, additional iterations of dependency resolution may be repeated until no additional dependencies are found. Thus, the dependency graph may include multiple levels of dependencies populated by all resources on which the requested resource depends.

At step 816, the resources may be concatenated to create a response ordered based on the resources' respective dependencies. Thus, according to some implementations, the order in which the resources have been included in the dependency graph may determine the order in which the resources are concatenated. Returning to a previous example, if the requested resource "xcp_feedback_lib" depends on libraries "xcp_error_message_window" and "xcp_notification_window," libraries "xcp_error_message_window" and "xcp_notification_window" will be included before "xcp_feedback_lib" in the dependency graph. Thus, the libraries will be concatenated in the order "xcp_error_message_window," "xcp_notification_window," then "xcp_feedback_lib."

At step 818, the response may be sent to the client machine. Thus, according to various implementations, a message may be sent to the client machine that includes the resource that was originally requested by the client machine. The message may further include all resources that the requested resource depends on. The resources may be ordered so that no dependency errors occur when the response is interpreted and executed by a web browser.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
    receiving, by a server computing system, a request from a client computing system for a new component for an enterprise application, the enterprise application being accessed through a web browser associated with the client computing system, the new component being associated with a first scripting language resource independent of the client computing system, wherein a scripting language resource comprises scripting language source code that provides one or more functionalities for the enterprise application;
    identifying, by the server computing system in response to the request from the client computing system, all scripting language resources that the requested first scripting language resource depends on based on dependency information, wherein the dependency information identifies dependencies between the first scripting language resource and the scripting language resources that the requested first scripting language resource depends on, the scripting language resources comprising two or more scripting language resources stored on the server computing system;
    determining, by the server computing system, a dependency order of the requested first scripting language resource and all the identified scripting language resources based on the dependency information; and
    transmitting, by the server computing system to a web browser associated with the client computing system, a single response to the received request, the single response including the requested first scripting language resource and all the identified scripting language resources that the requested first scripting language resource depends on in the determined dependency order.

2. The method of claim 1, wherein the identifying further comprises:
    querying a storage location in response to receiving the request; and
    retrieving the dependency information from the storage location.

3. The method of claim 2, wherein the storage location is a class path that stores all scripting language resource files associated with an instance of the web application and stores component definitions associated with all of the scripting language resource files.

4. The method of claim 1, wherein the request includes dependency information that declares dependencies between the first scripting language resource and the scripting language resources that the requested first scripting language resource depends on.

5. The method of claim 4, wherein the request is an extensible markup language (XML) configuration file that includes one or more tags identifying a component definition associated with the first scripting language resource.

6. The method of claim 1, wherein the identifying comprises generating a dependency graph that includes a plurality of levels of dependencies associated with the first scripting language resource.

7. The method of claim 6, wherein the response includes a concatenation of the first scripting language resource and the scripting language resources that the requested first scripting language resource depends on ordered based on the dependency graph.

8. The method of claim 1, wherein the first scripting language resource provides one or more functions for the new component.

9. A computer program product, comprising a non-transitory computer-readable medium having a computer-readable program code embodied therein, the computer-readable program code including instructions adapted to be executed by one or more processors to:
    receive a request for a new component for an enterprise application, the enterprise application being accessed through a web browser associated with a client computing system, the new component being associated with a first scripting language resource independent of the client computing system, wherein a scripting language resource comprises scripting language source code that provides one or more functionalities for the enterprise application;

identify, in response to the request from the client computing system, all scripting language resources that the requested first scripting language resource depends on based on dependency information, wherein the dependency information identifies dependencies between the first scripting language resource and the scripting language resources that the requested first scripting language resource depends on, the scripting language resources comprising two or more scripting language resources stored on a server computing system that includes the one or more processors;

determine a dependency order of the requested first scripting language resource and all the identified scripting language resources based on the dependency information; and transmit, to a web browser associated with the client computing system, a single response to the received request, the single response including the requested first scripting language resource and all the identified scripting language resources that the requested first scripting language resource depends on in the determined dependency order.

10. The non-transitory computer-readable medium of claim 9, wherein the program code includes further instructions to:

query a storage location in response to receiving the request; and retrieve the dependency information from the storage location.

11. The non-transitory computer-readable medium of claim 10, wherein the storage location is a class path that stores all scripting language resource files associated with an instance of the web application and stores component definitions associated with all of the scripting language resource files.

12. The non-transitory computer-readable medium of claim 9, wherein the request includes dependency information that declares dependencies between the first scripting language resource and the scripting language resources that the requested first scripting language resource depends on.

13. The non-transitory computer-readable medium of claim 12, wherein the request is an extensible markup language (XML) configuration file that includes one or more tags identifying a component definition associated with the first scripting language resource.

14. The non-transitory computer-readable medium of claim 9, wherein the first scripting language resource provides one or more functions for the new component.

15. A system comprising:

a processor-based database management application, which when executed on a computer system, will cause the processor to:

receive a request for a new component for an enterprise application, the enterprise application being accessed through a web browser associated with a client computing system, the new component being associated with a first scripting language resource independent of the client computing system, wherein a scripting language resource comprises scripting language source code that provides one or more functionalities for the enterprise application;

identify, in response to the request from the client computing system, all scripting language resources that the requested first scripting language resource depends on based on dependency information, wherein the dependency information identifies dependencies between the first scripting language resource and the scripting language resources that the requested first scripting language resource depends on, the scripting language resources comprising two or more scripting language resources stored on the computing system;

determine a dependency order of the requested first scripting language resource and all the identified scripting language resources based on the dependency information; and transmit, to a web browser associated with the client computing system, a single response to the received request, the single response including the requested first scripting language resource and all the identified scripting language resources that the requested first scripting language resource depends on in the determined dependency order.

16. The system of claim 15, wherein the processor-based database management application, when executed, will further cause the processor to:

query a storage location in response to receiving the request; and retrieve the dependency information from the storage location, wherein the storage location is a class path that stores all scripting language resource files associated with an instance of the web application and store component definitions associated with all of the scripting language resource files.

17. The system of claim 15, wherein the request includes dependency information that declares dependencies between the first scripting language resource and the scripting language resources that the requested first scripting language resource depends on, and wherein the request is an extensible markup language (XML) configuration file that includes one or more tags identifying a component definition associated with the first scripting language resource.

* * * * *